(12) United States Patent
Lazaro Aguilar et al.

(10) Patent No.: US 12,705,994 B2
(45) Date of Patent: Aug. 11, 2026

(54) SYSTEM AND METHOD FOR AUDIO GUIDE

(71) Applicant: Universal City Studios LLC, Universal City, CA (US)

(72) Inventors: Alvaro Javier Lazaro Aguilar, Tampa, FL (US); Weiyi He, New York, NY (US); Ambar Aballo Ruiz, Miami, FL (US); Paige Lynette Reiter, Clarkston, MI (US); Thomas Owen Williams, Orlando, FL (US); Howard Bruce Mall, Winter Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/944,276

(22) Filed: Nov. 12, 2024

(65) Prior Publication Data

US 2026/0011256 A1 Jan. 8, 2026

Related U.S. Application Data

(60) Provisional application No. 63/667,442, filed on Jul. 3, 2024.

(51) Int. Cl.

| | |
|---|---|
| ***G09B 5/04*** | (2006.01) |
| ***G06F 40/40*** | (2020.01) |
| ***G06V 10/74*** | (2022.01) |
| ***G06V 20/50*** | (2022.01) |
| ***G10L 13/047*** | (2013.01) |
| ***H04N 23/66*** | (2023.01) |

(52) U.S. Cl.

CPC ............... *G09B 5/04* (2013.01); *G06F 40/40* (2020.01); *G06V 10/74* (2022.01); *G06V 20/50* (2022.01); *G10L 13/047* (2013.01); *H04N 23/66* (2023.01)

(58) Field of Classification Search

None

See application file for complete search history.

(56) References Cited

U.S. PATENT DOCUMENTS

| | | | |
|---|---|---|---|
| 9,026,555 | B2 | 5/2015 | Shahraray et al. |
| 9,285,871 | B2 | 3/2016 | Geisner et al. |
| 10,142,795 | B2 | 11/2018 | Colosky et al. |

(Continued)

FOREIGN PATENT DOCUMENTS

| | | |
|---|---|---|
| CN | 107451276 A | 12/2017 |
| CN | 110796777 A | 2/2020 |

OTHER PUBLICATIONS

Trichopoulos et al. "Crafting a Museum Guide Using ChatGPT4" Big Data Cogn. Comput. 2023, 7, 148. (Year: 2023).*

(Continued)

*Primary Examiner* — Robert J Utama

(74) *Attorney, Agent, or Firm* — Fletcher Yoder, P.C.

(57) ABSTRACT

A method of providing audio descriptions of landmarks includes causing a user device to capture an image via an imaging sensor of the user device, comparing the captured image to a reference image to identify a landmark that appears in the captured image, providing a prompt requesting a description associated with the identified landmark to a large language model (LLM), receiving an audio file of the description associated with the identified landmark, and providing the audio file of the description associated with the identified landmark to the one or more user devices.

20 Claims, 5 Drawing Sheets

(56) References Cited

U.S. PATENT DOCUMENTS

| | | | | |
|---|---|---|---|---|
| 10,695,689 | B2 | 6/2020 | Weston | |
| 11,249,544 | B2 | 2/2022 | Sicconi et al. | |
| 11,363,878 | B1 * | 6/2022 | Agbley | A45F 5/022 |
| 2018/0349700 | A1 * | 12/2018 | Percuoco | G06Q 10/06 |

OTHER PUBLICATIONS

Ivanov, Rosen. "ExhibitXplorer: Enabling Personalized Content Delivery in Museums Using Contextual Geofencing and Artificial Intelligence" Contextual Geofencing and Artificial Intelligence. ISPRS Int. J. Geo-Inf. Oct. 22, 2023, 12, 434 (Year: 2023).*

PCT/US2025/035400 International Search Report and Written Opinion mailed Sep. 24, 2025.

S. Alletto et al., "An Indoor Location-aware System for an IoT-based Smart Museum", Nov. 6, 2015 (Nov. 6, 2015), https://ailab.uniud.it/wp-content/uploads/2018/11/2016IEEE_IOT.pdf.

* cited by examiner

SYSTEM AND METHOD FOR AUDIO GUIDE

CROSS-REFERENCE TO RELATED APPLICATION

This application claims priority from and the benefit of U.S. Provisional Application Ser. No. 63/667,442, entitled "SYSTEM AND METHOD FOR AUDIO GUIDE", filed Jul. 3, 2024, which is hereby incorporated by reference in its entirety.

BACKGROUND

The present disclosure relates generally to providing audio descriptions associated with points of interest.

Audio guides for providing audio descriptions of points of interest typically rely on a user to identify a point of interest and then enter a number for the point of interest, or scan a barcode or quick response (QR) code corresponding to the point of interest. The audio guide then provides the audio description corresponding to the point of interest. Accordingly, current audio guides are not very usable for people experiencing vision loss who may not be able to see numbers, barcodes, and/or QR codes corresponding to points of interest. Further, it is now recognized that the one-size-fits-all approach of current audio guide systems does not provide a way for users to control the level of detail of information provided by audio guides. As such, new techniques for improved audio guides are needed.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below In an embodiment, an audio guide system includes a portable device associated with a guest, a beacon, and a computing device. The portable device includes an imaging sensor configured to capture an image. The beacon is configured to detect a presence of the portable device in an area and cause the imaging sensor of the portable device to capture the image. The computing device includes processing circuitry and memory storing instructions. The instructions, when executed by the processing circuitry, cause the processing circuitry to receive the captured image, compare the captured image to a reference image to identify a landmark that appears in the captured image, generate a prompt requesting a description associated with the identified landmark, provide the prompt to a large language model (LLM), receive, from the LLM, the description associated with the identified landmark, provide the description associated with the identified landmark to a text-to-speech model, generate an audio file of the description associated with the identified landmark from the text-to-speech model, and provide the audio file of the description associated with the identified landmark to the portable device to play the audio file.

In an embodiment, a method of providing audio descriptions associated with landmarks includes causing the user device to capture an image via an imaging sensor of the user device, comparing the captured image to a reference image to identify a landmark that appears in the captured image, providing a prompt requesting a description associated with the identified landmark to a LLM, generating an audio file of the description associated with the identified landmark, and providing the audio file of the description associated with the identified landmark to the one or more user devices.

In an embodiment, a non-transitory computer readable medium stores instructions that cause the processing circuitry to receive a captured image, compare the captured image to a reference image to identify a landmark that appears in the captured image, provide a prompt requesting a description associated with the identified landmark to a LLM, receive the description associated with the identified landmark from the LLM, provide the description associated with the identified landmark to a text-to-speech model, receive an audio file of the description associated with the identified landmark from the text-to-speech model, and provide the audio file of the description associated with the identified landmark to a user device to play the audio file.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
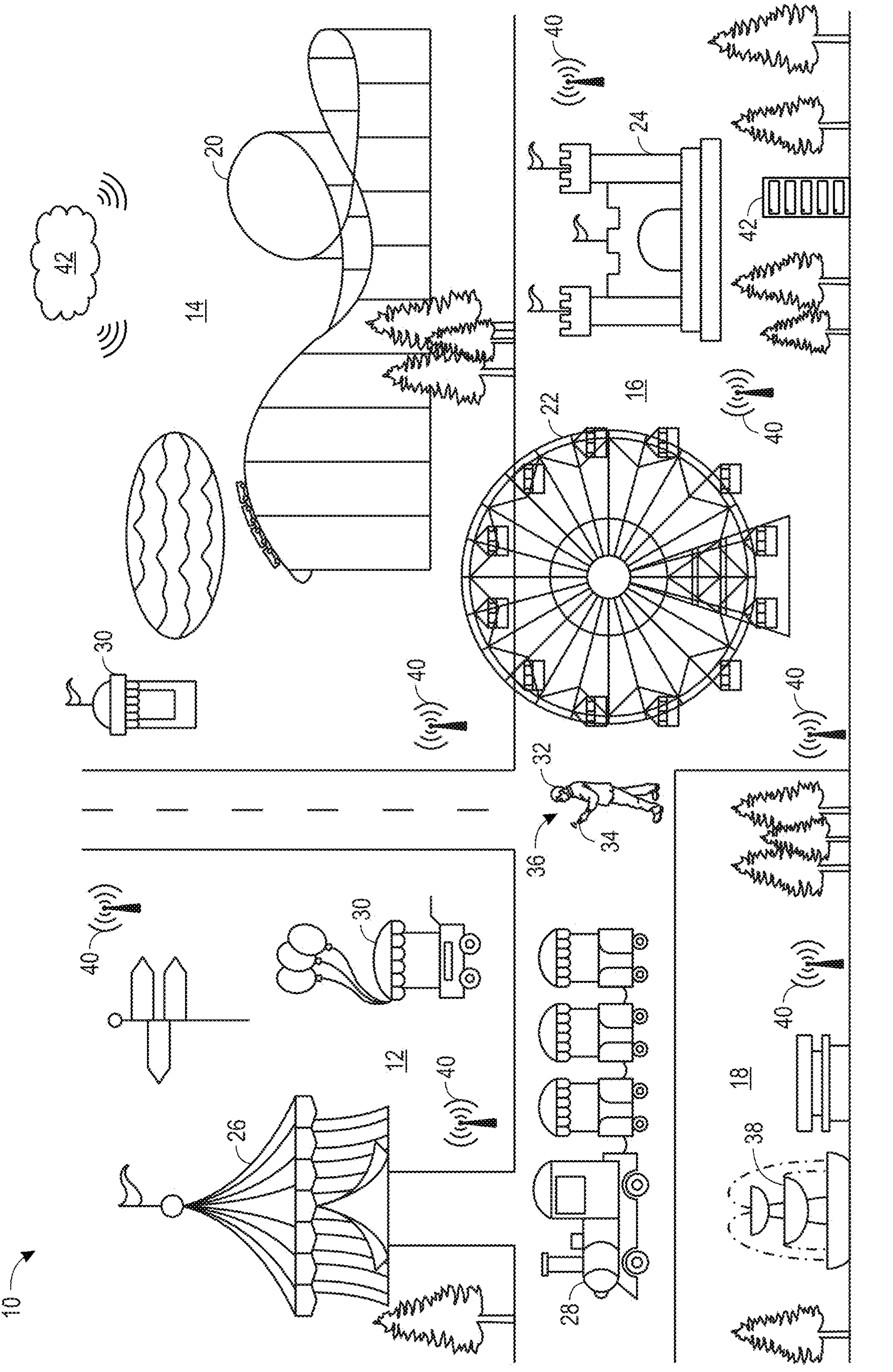
FIG. 1 is a schematic of an audio guide system being used in an amusement park, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1 percent of a target, within 1 percent of a target, within 5 percent of a target, within 10 percent of a target, within 25 percent of a target, and so on). Moreover, it should be understood that any exact values, numbers, measurements, and so on, provided herein, are contemplated to include approximations (e.g., within a margin of suitable or contemplatable error) of the exact values, numbers, measurements, and so on).

The present disclosure is directed to techniques for providing audio descriptions associated with points of interest within curated environments, such as amusement parks, museums, historical sites, zoos, parks, art galleries, fairs, trade shows, conferences, conventions, expos, festivals, and so forth. A guest may be equipped with one or more user devices. For example, the user devices may include a wearable device affixed to the clothing of the guest, a handheld device held by the guest or stored in the guest's pocket, a mobile device, and so forth. A beacon may detect the presence of one of the user devices and ping the user device, causing the user device (e.g., the wearable device or a mobile device) to capture an image, which may be used as a proxy for the guest's field of view and/or the direction the guest is facing. The captured image may be transmitted to a server and compared (e.g., via a feature matching model) to reference images (e.g., retrieved from a landmark images database) to identify known landmarks or features of known landmarks in the captured image. The server generates a prompt requesting a description associated with the identified landmark and provides the prompt as an input to a large language model (LLM), which generates a text description associated with the landmark. The server provides the text description to a text-to-speech model, which generates an audio file of the text description as speech. The server transmits the audio file to the user device to be played to the guest (e.g., via a speaker, headphones, etc.). In some embodiments, the guest may request additional information, such as additional information about the identified landmark, directions to a different landmark, and so forth. Accordingly, the server may receive the request, generate an additional input requesting additional information, and provide the additional input to the LLM. The LLM generates additional text, which is provided to the text-to-speech model to generate an additional audio file, which is transmitted to the user device to be played to the guest.

FIG. 1 is a schematic of an amusement park 10. The amusement park 10 may include and/or be separated into one or more sections or lands, such as a first land 12, a second land 14, a third land 16, and a fourth land 18. Each of the lands 12, 14, 16, 18 may include one or more attractions. As shown in FIG. 1, the attractions may include rides, such as roller coasters 20, carousels 22, or attractions in which a guest is moved through an environment, environments through which guests walk, such as castles 24, performance venues 26, and so forth. The amusement park 10 may also include transportation 28, such as trams, trains, trolleys, and so forth that are configured to move guests within or between lands 12, 14, 16, 18 of the amusement park 10. Further, the amusement park 10 may include one or more vending locations 30. The vending locations 30 may be stationary (e.g., a storefront), mobile (e.g., a cart), or semi-mobile (e.g., a stand), and configured to sell items, such as food, merchandise, toys, souvenirs, toiletries, and so forth to guests.

A guest 32 visiting the amusement park 10 may utilize a mobile device 34 (e.g., a smartphone, tablet, etc.) equipped with a mobile application or configured to access a webpage to perform various tasks while inside the amusement park 10. For example, the guest 32 may utilize the mobile device 34 to join a virtual queue to experience an attraction, place an order for food, order or reserve merchandise or souvenirs, participate in promotions (e.g., give-aways, special edition merchandise releases, etc.) within the amusement park 10, attend, join a queue for, or reserve tickets for, events within the amusement park 10, signup to receive messages (e.g., related to weather, safety, attractions being closed, etc.) intended for guests 32 within the amusement park 10, and so forth.

In some embodiments, the mobile device 34 (via the application) and/or one or more pieces of dedicated hardware may be part of an audio guide system 36 for the guest 32. As the guest 32 moves about the amusement park 10, the guest 32 may pass one or more landmarks or points of interest (e.g., the roller coaster 20, the carousel 22, the castle 24, the performance venue 26, the vending location 30, statues, fountains 38, etc.). The audio guide system 36 may be configured to identify nearby landmarks and play an audio description associated with the landmark for the guest 32. Specifically, multiple beacons 40 (e.g., Bluetooth-enabled microcontrollers, routers, switches, edge devices, internet of things (IoT) devices, or other processor-based computing devices) may be distributed throughout the amusement park 10 and configured to detect the presence of the mobile device 34 and/or other components of the audio guide system 36. The beacon 40 may query a wearable device of the audio guide system 36 that includes a camera or other imaging sensor, or the mobile device 34, to collect one or more images from the perspective of the guest 32. Such communication may utilize cellular networks, Bluetooth, Wireless Fidelity (WiFi), Global Positioning System (GPS), Radio Frequency Identification (RFID), Near Field Communication (NFC), and so forth, or some combination thereof. The one or more images may be provided to a server 42 (e.g., a cloud server, a remote server, an on-prem server, etc.) and compared to one or more reference images to identify one or more features from the reference images that appear in the images collected from the audio guide system 36. Based on the identified features, the server 42 may be able to determine which direction the guest 32 is facing, and what, if any, landmarks are in the guest's field of view.

Based on the guest's location, the direction the guest 32 is facing, and/or the landmarks in the guest's field of view, the server 42 generates an input and provides the input to a large language model (LLM) to generate a text description associated with the landmarks in the guest's field of view. For example, the description may describe the landmark itself, nearby landmarks, the location, nearby activities, and so forth. As used herein, an LLM is a computational model capable of natural language understanding, natural language processing, and language generation. LLMs learn statistical relationships from text during supervised, semi-supervised, and/or unsupervised training processes that enable the LLM to perform the above-mentioned tasks. Typically, LLMs receive input, process the input, and generate an output.

The server 42 receives the output generated by the LLM and provides the output to a text-to-speech model to convert the text description output by the LLM to a speech audio file. The audio file is provided to the audio guide system 36 to be played for the guest (e.g., via the mobile device, a handheld device, speakers, headphones, etc.). In some embodiments, the guest 32 may provide inputs requesting more information (e.g., more detail), requesting less detailed descriptions, requesting directions to a landmark, and so forth. The guest inputs may be provided to the server 42 and the server 42 may generate new inputs for the LLM based on the guest inputs (e.g., more information about the landmark, directions to a different landmark based upon the guest's location, etc.). New outputs from the LLM are provided to the text to speech model. Further, audio files are generated, and provided to the audio guide system 36 to play for the guest 32. Accordingly, as the guest 32 moves about the amusement park 10, the audio guide system 36 may iteratively identify landmarks that are within the guest's field of view, or otherwise near the guest 32, and generate audio descriptions and/or directions that are played to the guest 32.

It should be understood, however, that though FIG. 1 illustrates the audio guide system 36 in the context of an amusement park 10, that embodiments are envisaged in which the audio guide system 36 is utilized outside of the context of the amusement park 10. For example, the audio guide system 36 may be used in museums, historical sites, zoos, parks, art galleries, fairs, trade shows, conferences, conventions, expos, festivals, and/or any other setting in which audio guides may be used.

Figure 2:
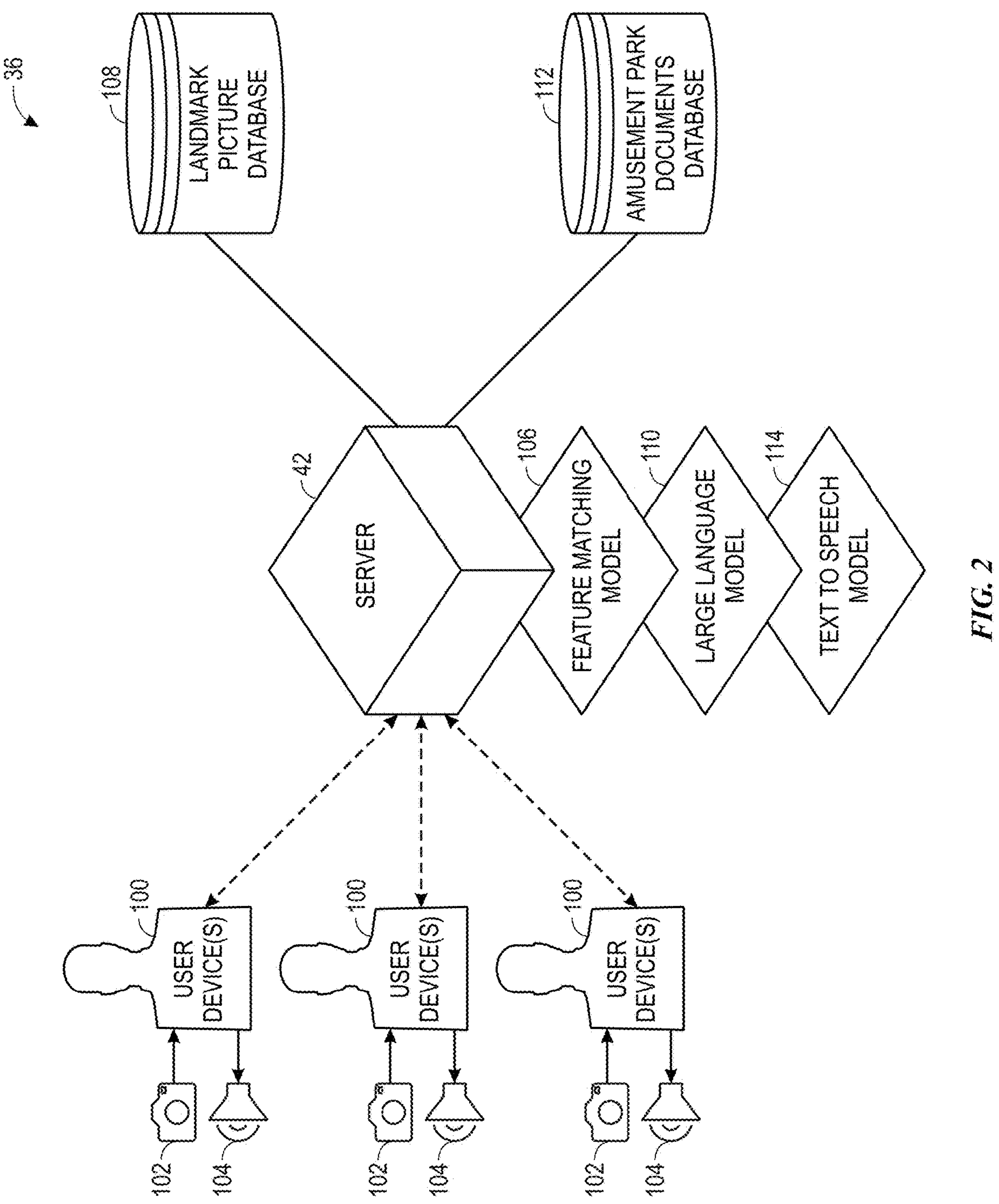
FIG. 2 is a schematic illustrating specifics of the audio guide system of FIG. 1, in accordance with an embodiment of the present disclosure.

FIG. 2 is a schematic of the audio guide system 36 shown in FIG. 1. As shown, guests may be equipped with one or more user devices 100. The one or more user devices 100 may include a wearable device, a handheld device, a mobile device, one or more additional devices, or some combination thereof. As shown, the user devices 100 carried by a respective guest may collectively include an imaging sensor 102 (e.g., a camera) and a speaker 104, which may include a speaker, headphones, or other component configured to project audio. Accordingly, it should be understood that for a given set of user devices carried by a respective guest, the imaging sensor 102 and the speaker 104 may be distributed across multiple user devices 100 or combined into a single user device 100. For example, in an embodiment, the user devices 100 may include a wearable device (e.g., as shown and described with regard to FIG. 4) that includes an imaging sensor and a handheld device (e.g., as shown and described with regard to FIG. 5), which may include a speaker for projecting audio and/or an audio port by which the handheld device is configured to connect to headphones. In an embodiment, the user device 100 may be a mobile device having an imaging sensor 102 and a speaker 104 (e.g., headphones).

As previously described, a user device 100 may capture one or more images via the imaging sensor 102 and transmit the one or more images to the server 42. The images may act as a proxy for what the guest sees, what is in the guest's field of view, and/or what objects the guest is facing, and so forth. The server 42 may pass the one or more images to a feature matching model 106, which may run on the server 42 or on a different server (e.g., an on-prem server, a cloud server, a remote server, etc.) accessible by the server 42. The feature matching model 106 may have access to a landmark pictures database 108 that includes reference pictures of landmarks within the amusement park. The reference pictures in the landmark pictures database 108 may includes tags, metadata, markups, etc. that identify landmarks based on features of those landmarks. Accordingly, the feature matching model 106 may be configured to compare the one or more images captured by the imaging sensor 102 of the user device 100 to the reference images in the landmark pictures database 108 to identify landmarks, or features of landmarks, in the one or more images captured by the imaging sensor 102 of the user device 100.

Figure 3:
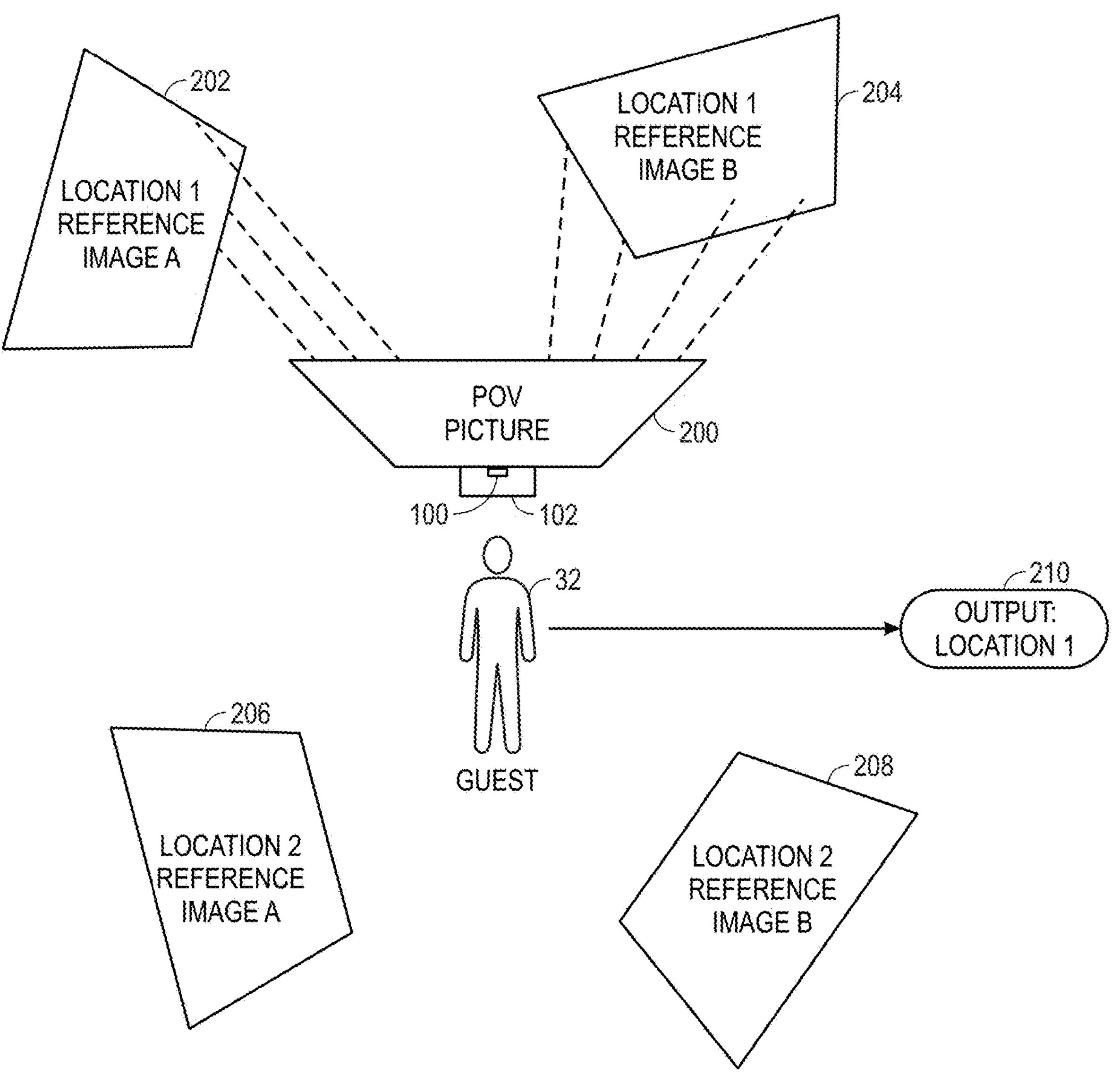
FIG. 3 is a schematic illustrating landmark identification, and/or landmark feature identification by the audio guide system of FIGS. 1 and 2, in accordance with an embodiment of the present disclosure.

FIG. 3 is a schematic illustrating landmark identification, and/or landmark feature identification, in an image 200 captured by the imaging sensor 102 of the user device 100. The user device 100 may be worn by the guest 32, affixed to the guest's clothing, held by guest 32, and so forth so the imaging sensor 102 is generally facing the same direction as the guest's point of view such that the image 200 captured by the imaging sensor 102 is generally representative of the guest's field of view or the direction the guest 32 is facing. As previously described, the feature matching model may retrieve reference images 202, 204, 206, 208 from the landmark pictures database 108. In some embodiments, the image 200 may be geotagged (e.g., include metadata indicative of the location in which the image 200 was captured). The reference images 202, 204, 206, 208 from the landmark pictures database 108 may also be geotagged, or their locations known such that relevant reference images 202, 204, 206, 208 from the same location or near the same location may be identified and selected or irrelevant reference images filtered out.

The feature matching model 106 compares features from the image 200 to features of the reference images 202, 204, 206, 208 to identify features of landmarks. As shown in FIG. 3, the image 200 includes features from first and second reference images 202, 204. Accordingly, the server 42 can determine that the guest 32 is facing a direction that is between and overlaps with the first and second reference images 202, 204 and outputs the guest's location and/or direction 210, or landmarks that appear in the image 200. It should be understood, however, that the schematic of FIG. 3 is merely an example and that other embodiments are possible. For example, in some embodiments, the image 200 captured by the imaging sensor 102 may overlap entirely with a single reference image (e.g., image 202).

Returning to FIG. 2, once the landmarks appearing in the one or more images captured by the imaging sensor 102 of the user device 100 are identified, the server 42 generates an input requesting a description associated with the landmarks and passes the input to an LLM 110. The LLM 110 receives the input and generates a text description associated with the landmarks appearing in the one or more images captured by the imaging sensor 102 of the user device 100. In some embodiments, the description may be a description of the landmarks appearing in the one or more captured images. Alternatively or additionally, the LLM 110 may receive the input and generate a general description of a location associated with the landmarks, one or more activities associated with the landmarks, a description of event scheduling associated with the landmarks, or any other data associated with the landmarks or areas surrounding the landmarks. As with the feature matching model 106, the LLM 110 may run on the server 42 or on a different server (e.g., an on-prem server, a cloud server, a remote server, etc.) accessible by the server 42. The LLM 110 may be trained on or otherwise have access to an amusement park documents database 112, which may include documents with background information about landmarks within the amusement park. For example, the documents stored in the amusement park documents database 112 may include information about how old a landmark is, when the landmark was created, who designed the landmark, what the landmark represents, what the landmark is made out of, how much the landmark cost to build, notable events related to the landmark, and so forth. In some embodiments, the amusement park documents database 112 may also include information about available activities, event schedules, maintenance schedules, and so forth. In some embodiments, the input may include, or the LLM 110 may learn over time a guest's preference for level of detail. For example, if a guest repeatedly asks for more information about landmarks, or lingers around landmarks, the audio guide system 36 may adapt by having the LLM 110 generate more detailed initial descriptions associated with landmarks. Correspondingly, if a guest 32 does not seem particularly interested in landmarks (e.g., the guest stops the description before completion, begins walking away from the landmark before the description is complete, or never asks for more information), the audio guide system 36 may adapt by having the LLM 110 generate shorter, more concise descriptions associated with landmarks. In some embodiments, an interest profile may be maintained for a guest to keep track of the guests interests and/or disinterests.

Along these lines, the audio guide system 36 may categorize landmarks into different categories, and learn which categories the guest seems to care about. Accordingly, the audio guide system 36 may be configured to provide longer, more detailed descriptions associated with landmarks in categories for which the guest has demonstrated interest. Correspondingly, the audio guide system 36 may be configured to provide shorter, more concise descriptions, or avoid providing descriptions all together, or landmarks for which the guest has not demonstrated interest, or demonstrated a lack of interest. Along these lines, the audio guide system 36 may be configured to prioritize landmark descriptions associated with landmarks of a type that the guest has demonstrated interest over landmarks for which the guest has not demonstrated interest, or demonstrated a lack of interest. For example, guests may display a particular interest in, or a particular disinterest in, landmarks related to plants and trees, wildlife, superheroes, automobiles, architecture, rollercoasters, water attractions, types of food, space travel, military, music, cultures or countries, and so forth. Further, the guest may display an interest or disinterest in particular characters, shows, movies, universes of characters, artists, etc. Accordingly, the audio guide system 36 may be configured to provide more detailed descriptions associated with landmarks for which the guest has demonstrated an interest, and provide shorter descriptions, or no descriptions at all of landmarks for which the guest has not demonstrated interest, or demonstrated a lack of interest.

Data representative of a guest's preferences regarding the level of detail of descriptions and/or particular categories associated with landmarks for which the guest has displayed a particular interest or disinterest may be referred to collectively as "contextual data" and may be passed to the LLM with an input or used to train the LLM.

The server 42 may receive the text description associated with the one or more landmarks and provide the text description to a text to speech model 144 configured to turn the text description generated by the LLM 110 into an audio file of speech of the description. In some embodiments, the LLM 110 and the text to speech model 144 may be combined into a single LLM configured to generate an audio description associated with a landmark in response to receiving an input requesting a description associated with one or more attractions. Upon receipt of the audio file of speech of the description from the text to speech model 144, the server 42 transmits the audio file to the user device 100 to play for the guest via the speaker 104.

The user device 100 may include a user interface enabling the guest to request additional information (e.g., more information about the identified landmark, directions to a different landmark, etc.). For example, the user interface may include one or more buttons or a keyboard, a microphone configured to hear the guest speaking, a different interface, or some combination thereof. If such inputs are received, the user device 100 transmits the inputs to the server 42, which provides an additional input to the LLM 110 asking for additional information. The LLM 110 generates an output, which may be passed to the text to speech model 144 to generate an audio file based on the output generated by the LLM 110. The audio file is transmitted to the user device 100 by the server and played for the guest via the speaker 104. In an embodiment, a user's interest profile may be updated based on the feedback.

Figure 4:
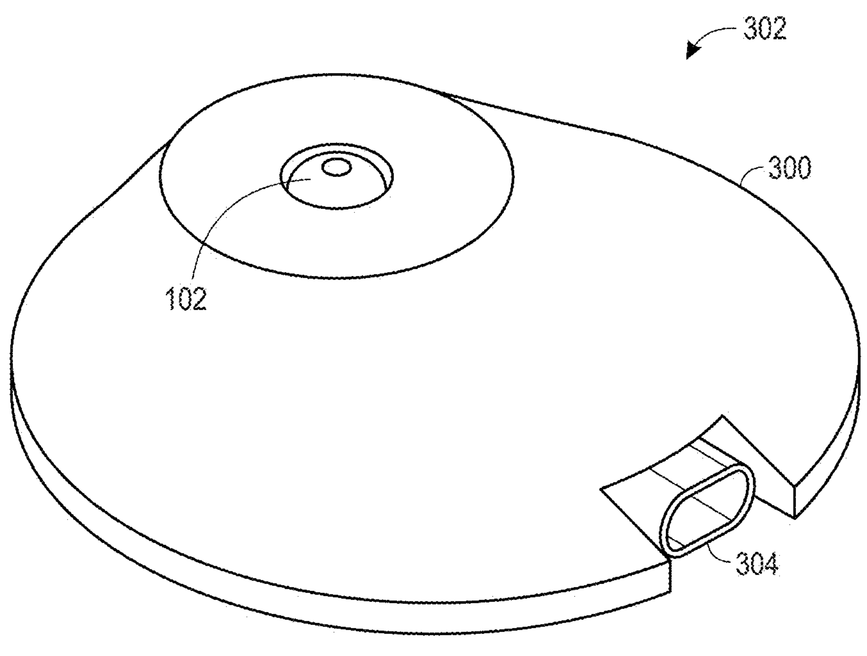
FIG. 4 is a perspective view of a wearable device of the audio guide system of FIGS. 1 and 2, in accordance with an embodiment of the present disclosure.

FIG. 4 is a perspective view of a wearable device 300, which may be one of the user devices 100 shown in FIG. 2. A back of a housing of the wearable device 300 may include adhesive, a pin, a hook and loop interface, or some other mechanism for affixing the wearable device 300 to a guest's clothing. As shown and previously described, the wearable device 300 may include an imaging sensor 102 (e.g., a camera) for capturing images that may be used as a proxy for the direction the guest 32 is facing and/or the guest's field of view. The wearable device 300 also includes a port 304, which may be used to connect the wearable device 300 via a cable to charge the wearable device 300, retrieve images from the wearable device 300, troubleshoot or run diagnostics on the wearable device 300, couple headphones to the wearable device 300 and so forth.

Figure 5:
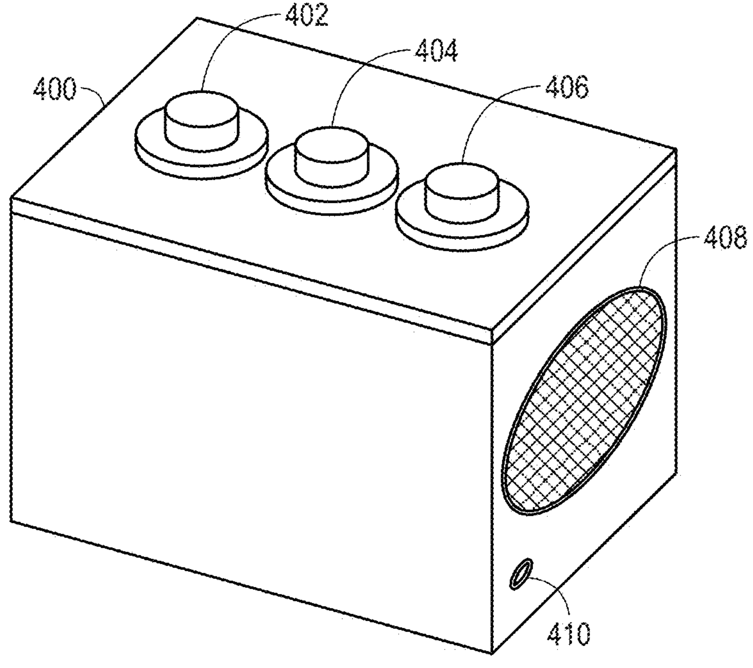
FIG. 5 is a perspective view of a handheld device of the audio guide system of FIGS. 1 and 2, in accordance with an embodiment of the present disclosure.

FIG. 5 is a perspective view of a handheld device 400, which may be one of the user devices 100 shown in FIG. 2. The handheld device 400 includes a housing, which may have one or more buttons 402, 404, 406. The one or more buttons 402, 404, 406 may correspond to one or more inputs provided by the guest 32, such as "provide a basic description", "tell me more", and "give me directions to the landmark". As shown, the handheld device 400 may also include a speaker 408 for playing audio descriptions, and/or a port 410, which may allow the handheld device 400 to connect to headphones for playing audio descriptions. In some embodiments, the port 410 may also be used to connect the handheld device 400 via a cable to charge the handheld device 400, troubleshoot or run diagnostics on the handheld device 400, and so forth.

Though not shown in FIG. 5, in some embodiments, the user device 100 (e.g., the handheld device 400, the wearable device 300 of FIG. 4, and/or the mobile device 34 of FIG. 1) may include a microphone configured to detect audio of the guest's speech. For example, the guest may say into the microphone, "what is this?", and the audio guide system may understand the guest's speech, identify the landmark the guest is talking about, and generate a description of the landmark to be played to the guest.

Figure 6:
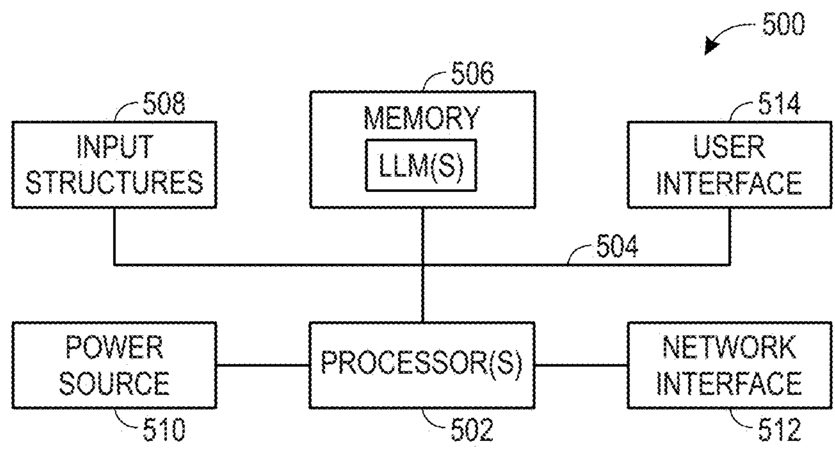
FIG. 6 is a block diagram of example components of a computing device used in the guide system of FIGS. 1 and 2, or some other device of FIGS. 1-5, in accordance with an embodiment of the present disclosure.

FIG. 6 illustrates a block diagram of example components of a computing device 500 that are configured to be used as the mobile device 34, the audio guide system 36, the beacons 40, the servers 42, the user devices 100, the wearable device 300, the handheld device 400, or some other device within the amusement park 10 shown in FIG. 1. As used herein, a computing device 500 may be implemented as one or more computing systems including laptop, notebook, desktop, tablet, or workstation computers, as well as server type devices, network devices, such as routers, switches, edge devices, etc., internet of things (IoT) devices, or portable, communication type devices, such as cellular telephones and/or other suitable computing devices.

As illustrated, the computing device 500 includes various hardware components, such as one or more processors 502, one or more busses 504, memory 506, input structures 508, a power source 510, a network interface 512, a user interface 514, and/or other computer components useful in performing the functions described herein.

The one or more processors 502 (e.g., processing circuitry) may include, in certain implementations, microprocessors configured to execute instructions stored in the memory 506 or other accessible locations. Alternatively, the one or more processors 502 may be implemented as application-specific integrated circuits (ASICs), field-programmable gate arrays (FPGAs), and/or other devices designed to perform functions discussed herein in a dedicated manner. As will be appreciated, multiple processors 502 or processing components may be used to perform functions discussed herein in a distributed or parallel manner.

The memory 506 may encompass any tangible, non-transitory medium for storing data or executable routines. Although shown for convenience as a single block in FIG. 6, the memory 506 may encompass various discrete media in the same or different physical locations. The one or more processors 502 may access data in the memory 506 via one or more busses 504. In some embodiments, the various components may communicate with one another wirelessly.

The input structures 508 may allow a user to input data and/or commands to the device 500 and may include mice, touchpads, touchscreens, keyboards, controllers, and so forth. The power source 510 can be any suitable source for providing power to the various components of the computing device 500, including line and battery power. In the depicted example, the device 500 includes a network interface 512. The network interface 512 may allow communication with other devices on a network using one or more communication protocols. In the depicted example, the device 500 includes a user interface 514, such as a display that may display images or data provided by the one or more processors 502. The user interface 514 may include, for example, a monitor, a display, and so forth. As will be appreciated, in a real-world context a processor-based system, such as the computing device 500 of FIG. 6, may be employed to implement some or all of the present approach, such as performing the functions of the mobile device 34, the audio guide system 36, the beacons 40, the servers 42, the user devices 100, the wearable device 300, the handheld device 400 shown in FIGS. 1-5, as well as other memory-containing devices.

Figure 7:
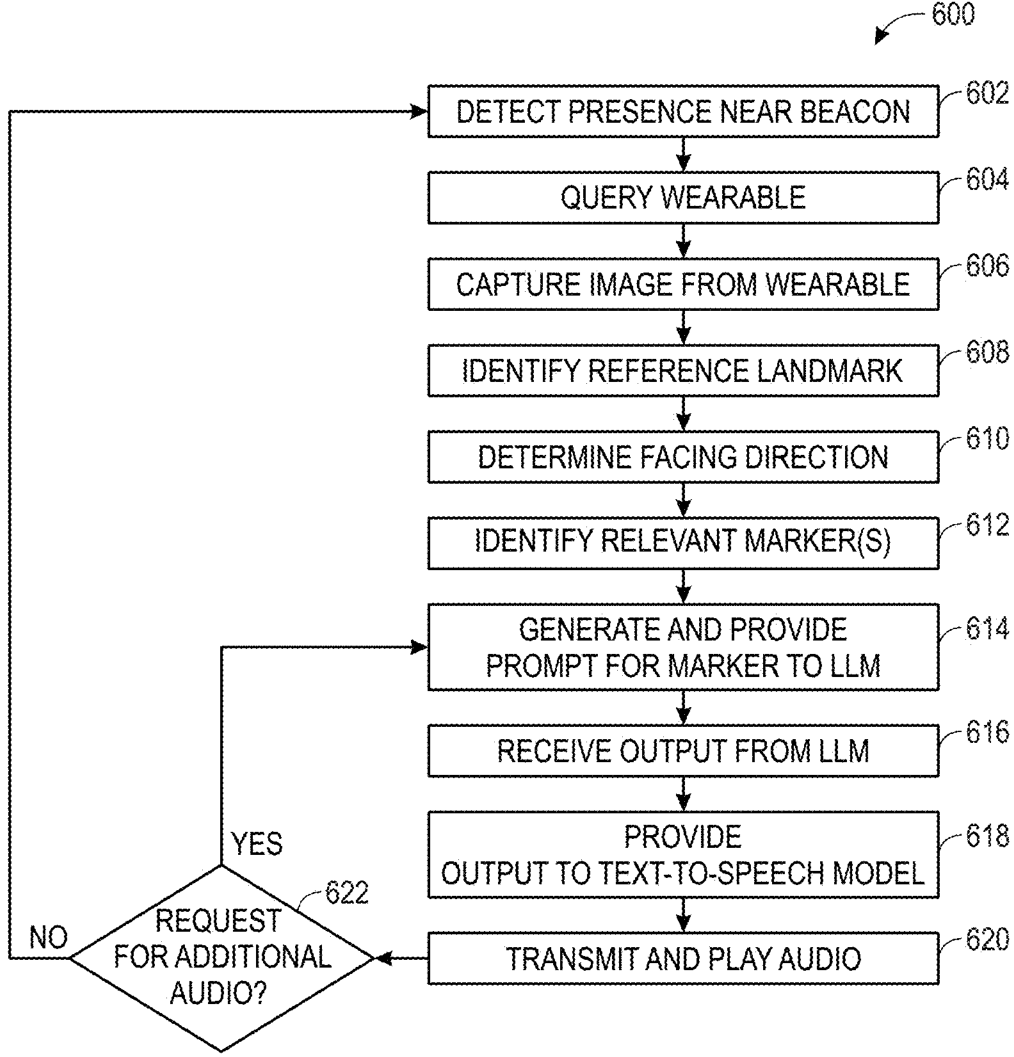
FIG. 7 is a flowchart of a process for operating an audio guide, in accordance with an embodiment of the present disclosure.

FIG. 7 is a flow chart of a process 600 for operating an audio guide. At 602, the process 600 detects the presence of a user device near a beacon. The detection may be based on WiFi, Bluetooth, NFC, GPS, RFID, other types of communication, or some combination thereof. For example, the process may detect when a user device is present in a room, enters an attraction, is standing near a beacon, and so forth. At 604, the process 600 queries (e.g., via the beacon) the user device, a wearable device associated with the user device if the user device is not a wearable device, or another device equipped with an image sensor (e.g., a mobile device) and associated with the user device. The query may be via Wifi, Bluetooth, NFC, RFID, or some other communication protocol. In some embodiments, the beacon may communicate with the user device via a server and an application or a web browser. At 606, an imaging sensor of the user device or on the wearable device is used to capture an image. In some embodiments, the imaging sensor may automatically capture the image. In some embodiments (e.g., when the image is captured using a mobile device), a user may be prompted (e.g., via a notification) to capture an image to allow the user to capture a picture that represents the direction the guest is facing. In some embodiments, geo-tagged data, and/or data collected by one or more sensors of the user device (e.g., a mobile device), such as a magnetometer and/or compass, may be used in addition to or in place of photos to determine the direction the user is facing.

At 608, the process 600 identifies one or more reference landmarks in the captured image. For example, the captured image may be compared (e.g., via a feature matching model) to one or more reference images in a landmark pictures database to identify landmarks or features of landmarks from the one or more reference images that appear in the captured image. In some embodiments, the captured image may be compared to all of the reference images in the landmark pictures database. In some embodiments, the captured image may only be compared to reference images of landmarks at or near (e.g., within some threshold distance) the location of the beacon in communication with the user device. As previously described, the reference images may be tagged, marked up, have metadata, or otherwise have associated data that identifies landmarks, features of landmarks, or other characteristics of a physical environment that may be useful in determining a guest's location and/or a direction the guest is facing based on the captured image. At 610, based on the one or more reference landmarks, one or more features of reference landmarks, and/or one or more characteristics of the physical environment appearing in the captured image have been identified, the process determines which direction the guest is facing. At 612, the process 600 may reference a landmark database, a map of landmarks, and so forth to determine one or more relevant landmarks that may be in a guest's field of view or near a guest's field of view. In some embodiments, if a point of interest or candidate landmark is not included in the landmark database, a ticket may be created for the point of interest or candidate landmark to be added to the landmark database.

At 614, the process 600 generates a prompt requesting a description associated with the identified landmarks and provides the prompt the LLM. In some embodiments, the prompt may include or be accompanied by contextual data, such as guest preferences regarding desired level of detail of descriptions, particular areas of interest and/or disinterest. In some embodiments, the LLM may be trained on contextual data, or already have the contextual data and the prompt may include an identification of the guest, which may be used to retrieve the guest's preferences. At 616, the output, which may be a text description associated with the landmark, is received from the LLM.

At 618, the text output by the LLM may be provided to a text-to-speech model. The text-to-speech model is configured to receive the text description associated with the landmark output by the LLM and generate an audio file of speech of the description associated with the landmark. In some embodiments, the text-to-speech model may be included in the LLM, such that the LLM receives an input prompt requesting a description associated with an identified landmark and the LLM outputs an audio file of a speech description associated with the landmark. At 620, the audio file generated by the text-to-speech model is transmitted to the user device (e.g., the handheld device, the mobile device, etc.) and played for the guest via a speaker, headphones, and so forth.

In some embodiments, at 622, the guest may request additional audio. For example, the guest may request more information about the landmark described in the audio file, or the guest may request directions to a landmark. If the guest requests additional audio, the process 600 returns to 614 and generates a prompt for the LLM based on the request. If the guest does not request more audio, the process returns to block 602 when the beacon detects the presence of another user device.

The present disclosure is directed to techniques for providing audio descriptions associated with points of interest within curated environments, such as amusement parks, museums, historical sites, zoos, parks, art galleries, fairs, trade shows, conferences, conventions, expos, festivals, and so forth. A guest may be equipped with one or more user devices. For example, the user devices may include a wearable device affixed to the clothing of the guest, a handheld device held by the guest or stored in the guest's pocket, a mobile device, and so forth. A beacon may detect the presence of one of the user devices and ping the user device, causing the user device (e.g., the wearable device or a mobile device) to capture an image, which may be used as a proxy for the guest's field of view and/or the direction the guest is facing. The captured image may be transmitted to a server and compared (e.g., via a feature matching model) to reference images (e.g., retrieved from a landmark images database) to identify known landmarks or features of known landmarks in the captured image. The server generates a prompt requesting a description associated with the identified landmark and provides the prompt as an input to a large language model (LLM), which generates a text description associated with the landmark. The server provides the text description to a text-to-speech model, which generates an audio file of the text description as speech. The server transmits the audio file to the user device to be played to the guest (e.g., via a speaker, headphones, etc.). In some embodiments, the guest may request additional information, such as additional information about the identified landmark, directions to a different landmark, and so forth. Accordingly, the server may receive the request, generate an additional input for additional information, and provide the additional input to the LLM. The LLM generates additional text, which is provided to the text-to-speech model to generate an additional audio file, which is transmitted to the user device to be played to the guest.

By utilizing the disclosed techniques, audio guides may be made more user friendly for guests experiencing vision loss who may not be able to clearly see numbers, barcodes, and/or QR codes corresponding to points of interest found in typical audio guide systems. Further, generated audio descriptions may be customized to each guest's desired level of detail of descriptions, interest or disinterest in various types of landmarks, and so forth, resulting in a more customizable and enjoyable guest experience.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An audio guide system, comprising:

a portable device associated with a guest, wherein the portable device comprises an imaging sensor configured to capture an image;

a beacon configured to:

detect a presence of the portable device in an area;

query the portable device based on detecting the presence of the portable device in the area; and cause the imaging sensor of the portable device to capture the image in response to the query; and a computing device comprising:

processing circuitry; and memory, accessible by the processing circuitry and storing instructions that, when executed by the processing circuitry, cause the processing circuitry to perform operations comprising:

receiving the captured image;

comparing the captured image to a reference image to identify a landmark that appears in the captured image;

generating a prompt requesting a description associated with the identified landmark;

providing the prompt to a large language model (LLM);

receiving, from the LLM, the description associated with the identified landmark;

providing the description associated with the identified landmark to a text-to-speech model;

receiving an audio file of the description associated with the identified landmark from the text-to-speech model; and providing the audio file of the description associated with the identified landmark to the portable device, wherein the portable device is configured to play the audio file in response to receipt of the audio file.

2. The audio guide system of claim 1, wherein the area comprises a portion of an amusement park.

3. The audio guide system of claim 1, wherein the portable device comprises:

a wearable device comprising the imaging sensor, wherein the wearable device is configured to be affixed to clothing of the guest; and a handheld device configured to play the audio file for the guest.

4. The audio guide system of claim 3, wherein the handheld device comprises a speaker, wherein the handheld device is configured to play the audio file for the guest via the speaker.

5. The audio guide system of claim 3, wherein the handheld device comprises a headphone port configured to couple the handheld device to one or more headphones, wherein the handheld device is configured to play the audio file for the guest via the one or more headphones.

6. The audio guide system of claim 1, wherein the portable device comprises a mobile device.

7. The audio guide system of claim 1, wherein the reference image is retrieved from a landmark images database.

8. A method of providing audio descriptions associated with landmarks, the method comprising:

detecting, via a beacon, a presence of a user device in an area;

querying, via the beacon, the user device based on detecting the presence of the user device in the area;

causing, via the beacon, the user device to capture an image via an imaging sensor of the user device in response to the query;

comparing the captured image to a reference image to identify a landmark that appears in the captured image;

providing, to a large language model (LLM), a prompt requesting a description associated with the identified landmark;

receiving an audio file of the description associated with the identified landmark; and providing the audio file of the description associated with the identified landmark to the user device.

9. The method of claim 8, wherein the audio file is generated by the LLM.

10. The method of claim 8, comprising:

receiving, from the LLM, the description associated with the identified landmark; and providing the description associated with the identified landmark to a text-to-speech model, wherein the audio file of the description associated with the identified landmark is generated by the text-to-speech model.

11. The method of claim 8, comprising:

receiving, from the user device, an input requesting additional description associated with the identified landmark;

providing, to the LLM, an additional prompt requesting the additional description associated with the identified landmark;

receiving an additional audio file of the additional description associated with the identified landmark; and providing the additional audio file of the additional description associated with the identified landmark to the user device.

12. The method of claim 8, comprising providing one or more pieces of contextual data to the LLM, wherein the contextual data comprises an interest profile associated with a guest.

13. The method of claim 12, wherein the contextual data is comprises one or more types of landmarks in which the guest has demonstrated interest or disinterest.

14. The method of claim 12, wherein the contextual data is comprises a level of detail preferred by the guest.

15. The method of claim 12, comprising training the LLM based on contextual data.

16. The method of claim 8, comprising:

causing an additional user device to capture an additional image;

identifying an additional landmark that appears in the captured additional image;

providing, to the LLM, an additional prompt requesting an additional description associated with the identified additional landmark;

receiving an additional audio file of the additional description associated with the identified additional landmark; and providing the additional audio file of the additional description associated with the identified additional landmark to the additional user device.

17. A non-transitory computer readable medium storing instructions that, when executed by processing circuitry, cause the processing circuitry to perform operations comprising:

detecting, via a beacon, a presence of a portable device in an area;

querying, via the beacon, the portable device based on detecting the presence of the portable device in the area;

causing, via the beacon, the imaging sensor of the portable device to capture the image in response to the query;

receiving the captured image from the portable device;

comparing the captured image to a reference image to identify a landmark that appears in the captured image;

providing, to a large language model (LLM), a prompt requesting a description associated with the identified landmark;

receiving, from the LLM, the description associated with the identified landmark;

providing the description associated with the identified landmark to a text-to-speech model;

receiving an audio file of the description associated with the identified landmark from the text-to-speech model; and providing the audio file of the description associated with the identified landmark to a user device, wherein the user device is configured to play the audio file in response to receipt of the audio file.

18. The non-transitory computer readable medium of claim 17, wherein the LLM is trained based on a database of amusement park documents.

19. The non-transitory computer readable medium of claim 17, wherein comparing the captured image to the reference image to identify the landmark that appears in the captured image is performed via a feature matching model.

20. The non-transitory computer readable medium of claim 17, wherein-the portable device comprises the user device.

* * * * *